United States Patent Office 3,432,915
Patented Mar. 18, 1969

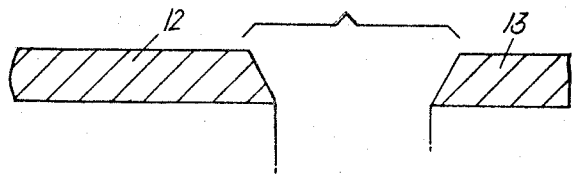
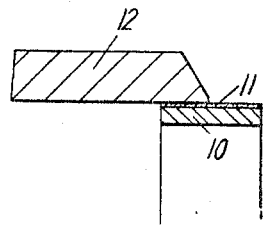
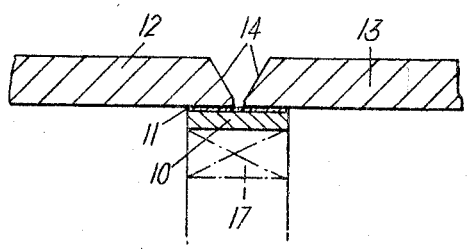
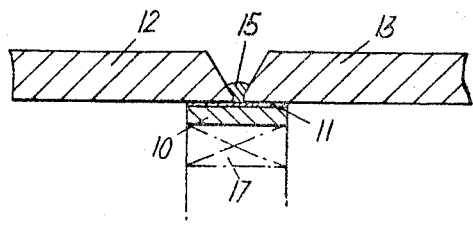
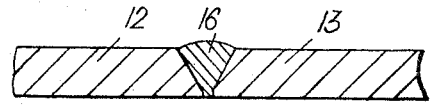

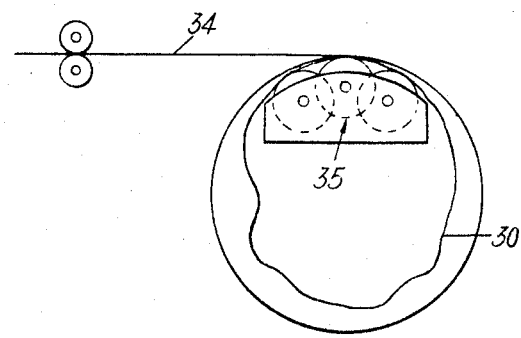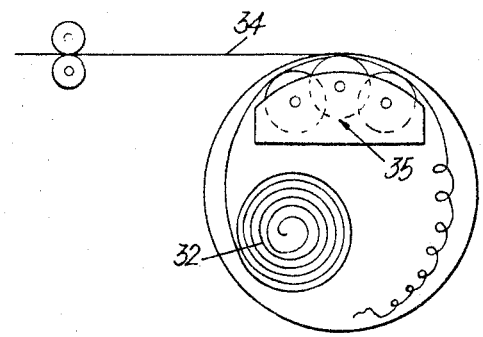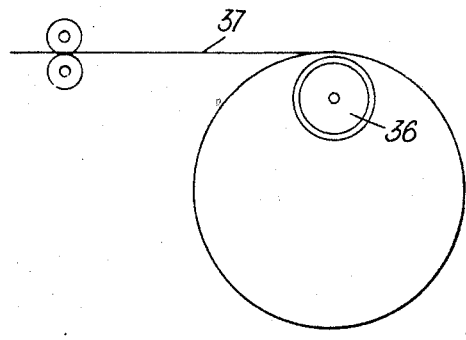

3,432,915
WELD BACKING MEMBER AND METHOD OF FORMING WELDED JOINTS IN METALLIC MEMBERS OR BETWEEN METALLIC MEMBERS
William Francis Doyle, Buckhill, Bedford, England, assignor to Stewarts and Lloyds Limited, Glasgow, Scotland, a British company
Filed Dec. 2, 1963, Ser. No. 327,232
Claims priority, application Great Britain, Dec. 5, 1962, 45,949/62
U.S. Cl. 29—491                     2 Claims
Int. Cl. B23k 5/22, 31/02

ABSTRACT OF THE DISCLOSURE

A method of welding in which is employed a metal backing member coated with a refractory oxide in particulate form.

---

This invention relates to improvements in weld backing members and to improved methods of forming welded joints between adjacent edges or faces of a metallic member or members.

The primary object of the present invention is to provide for forming a full penetration weld between adjacent edges or faces of a metallic member or members which may be in the form of plate, tube or other sections, in such wise as substantially to eliminate stress raisers and also, in the case of hollow sections, obstructions in the bore. It will be understood that this is particularly important in the case of pipe lines which, when welded together, are to present an unobstructed bore for, for example, flow of, liquids, aeriform media or solids through the pipes or for passage of "pigs" or "go-devils."

A weld backing member, according to this invention, comprises a support having a face adapted to contact the root of a weld to be effected in a joint, said face carrying a coating of refractory oxide in particulate form deposited thereon as at least partly molten finely divided particles resulting from projecting the oxide towards said face from a region of temperature in excess of the fusion point of the oxide.

Preferably the support has said coating applied thereto by feeding a rod of said oxide into a flame hot enough to melt the oxide, atomizing the molten oxide with a blast of gas as it was melted, and spraying the atomized molten oxide onto said face of the support. A flame spraying process using a rod of oxide is described in more detail in British Patent No. 745,257.

The refractory oxide preferably should have a melting point greater than 1,800° C. Suitable oxides are alumina ($Al_2O_3$) and zirconia ($ZrO_2$).

The support may be of metal or other suitable material. Preferably the support is flexible, e.g., it is in the form of flexible strip.

The backing member can be removed after completion of the root run of the weld and there is no difficulty in removing said member as the oxide coating serves as an effective heat barrier preventing fusion of the support with the molten metal.

In the accompanying drawings which illustrate different applications of the invention by way of example only:

FIGS. 1a to f illustrate the progressive stages in the formation of a butt-welded joint between two pipes according to one embodiment of the invention;

FIG. 8 illustrates diagrammatically a further embodiment of the method according to the invention;

FIG. 9 illustrates diagrammatically a further embodiment of said method; and

FIG. 10 illustrates diagrammatically yet a further embodiment of said method.

Figure 2:
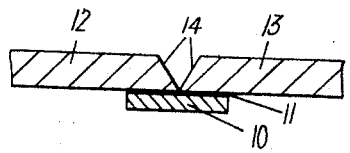
FIGS. 2 to 4 illustrate examples of different weld preparations applicable to welding from one side only.

Referring to FIGS. 1 to 7 in which like numerals denote like parts, 10 denotes a weld backing member in the form of a support the contact area of which has been coated with a smooth layer 11 of a refractory oxide, such as alumina or fused zirconia, by feeding a rod of said oxide into a flame hot enough to melt the oxide atomizing the molten oxide with a blast of gas as it melted, and spraying the atomized molten oxide onto said face of the support. As hereinbefore mentioned, this flame spraying process is described in more detail in British Patent No. 745,257.

In the constructions illustrated in FIGS. 1 to 4, the support 10 is in the form of a mild steel ring to the outer circumferential portion of which the layer 11 is applied.

Referring to FIGS. 1 to 4, the ring 10 is inserted into one end of a pipe 12 to be joined to another pipe 13 by a butt-welded joint. The ring 10 is so inserted into the pipe 12 as to project therefrom to serve as a spigot for location of the pipe 13 relative to the pipe 12. The pipes 12 and 13 are then located relative to one another with the projecting part of the ring 10 inserted into the pipe 13, a welding groove 14 being formed beween adjacent ends of the pipes.

In the form shown in FIG. 1, the groove 14 is a single V with a root face and a root gap.

In the form shown in FIG. 2, the groove 14 is a single V without a root face or a root gap.

Figure 3:
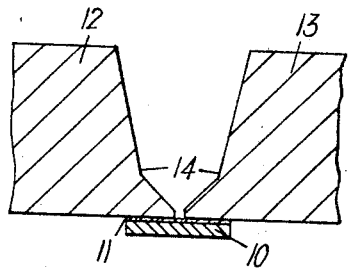

In the form shown in FIG. 3, the groove 14 is another form of single V, with a root face and a root gap, similar to that illustrated in FIG. 1, but the wall thickness of the pipes 12, 13 is greater than that of the pipes in FIG. 1.

Figure 4:
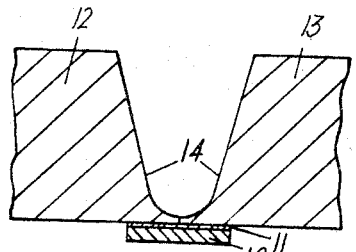

In the form shown in FIG. 4, the wall thickness of the pipes 12, 13 is similar to that the pipes illustrated in FIG. 3, but the groove 14 is a single U with a root face, but no root gap.

After the pipes 12, 13 shown in FIGS. 1 to 4 have been located relative to one another, the weld root run 15 (FIG. 1) is effected. As the oxide layer 11 serves as an effective heat barrier to fusion of the ring 10 with the weld, the ring may now be removed from the two pipes, and the weld 16 (FIG. 1) completed.

Because the oxide layer 11 is smooth and confines the molten metal, the root is left clean, thus substantially eliminating stress raisers and leaving the bore of the pipes unobstructed for the free flow of liquids, aeriform media or solids or the passage of "pigs" or "go-devils." The smooth bore face also assists in inspection and testing of the weld.

Should the ring 10 be split, expanders 17 (FIG. 1) can be used in the ring to ensure that the ring, being made of flexible strips, is a close fit against the root of the weld.

It will be understood that the invention is applicable to the welding of metals of any profile or cross-section, for example, plates or sections, and is not limited to tubes, the support 10 then being in the form of a strip.

Figure 5:
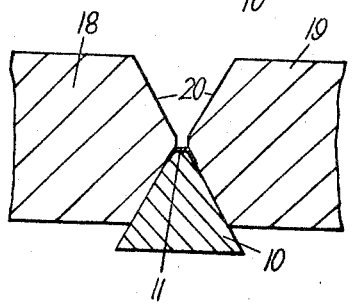
FIG. 5 illustrates an example of welding from both sides.

Referring to FIG. 5, there are illustrated two metallic members 18, 19, having ends so profiled that when said members are located relative to one another as shown in FIG. 5 said ends define a double-V welding groove 20 having a root face and a root gap. The support 10 is frustoconical in cross-section, the oxide layer 11 being applied to cover the frustum and at least part of the adjoining wall surfaces of the support. The support 10 is inserted into one V of the groove 20 and the weld root run is effected in the opposite V of the groove. As the oxide layer 11 serves as an effective heat barrier to fusion of the support 10 with the weld, the support may now be removed and the welding completed on both sides in any desired sequence without prior back-chipping on the root run.

Figure 6:
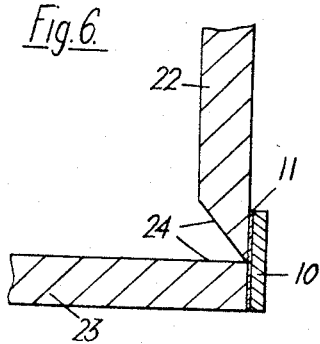
FIG. 6 illustrates an example of welding a branch to a main.

Referring to FIG. 6, there is illustrated the welding of a branch 22 onto a pipe 23. The end of the branch 22 to be welded to the pipe 23 is bevelled as shown and is so placed on the pipe 23 that the bore of the branch 22 is flush with the aperture in the pipe 23 and there is defined a welding groove 24. The support 10 is in the form of a mild steel ring to the outer circumferential portion of which the oxide layer 11 is applied. The ring is inserted into the branch 22 to bear against the bore of the branch 22 and the associated face of the aperture in the pipe 23. A weld root run is effected in the groove 24 and as the oxide layer 11 serves as an effective heat barrier to fusion of the ring 10 with the weld, the ring may now be removed and the weld completed, the bore of the branch 22 being unobstructed.

Figure 7:
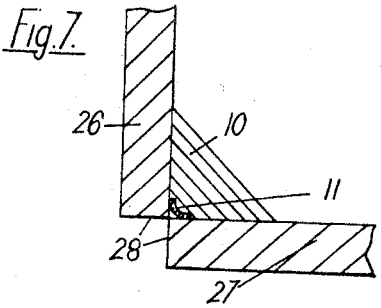
FIG. 7 illustrates an example of welding two plates at right angles to each other.

Referring to FIG. 7, there is illustrated the welding together of two plates 26, 27 located at right angles to one another and adjacent end faces defining a welding groove 28. The support 10 is wedge-shaped in cross-section and the oxide layer 11 is applied to the apex of the support. The support is located abutting against the plates 26, 27 with the layer 11 adjacent to the root of the groove 28. A weld root run is then effected in the groove 28 and as the oxide layer serves as an effective heat barrier to fusion of the support 10 with the weld, the support may now be removed and the weld completed.

The invention is also applicable to the welding of strip in spiral form and such an application is shown in FIGS. 8 to 10.

In FIG. 8 there is illustrated a weld backing member in the form of a suitably supported endless flexible band 30.

In FIG. 9 there is illustrated a weld backing member in the form of a suitably supported metallic coil of flexible strip 32. The outer face of band 30 or the coiled strip 32 is coated with a smooth layer of refractory oxide in the same way as in the previous embodiments described.

In the constructions illustrated in FIGS. 8 and 9, the face of the band 30 (FIG. 8) or the coiled strip 32 (FIG. 9) coated with the oxide layer is maintained continuously in contact with the root at the welding point of a strip 34 by pressure rollers 35 which also move the band 30 or the coiled strip 32 in unison with the strip 34 during the welding process which is effected from the outside.

In FIG. 10 there is illustrated a weld backing member in the form of a suitably supported cylindrical drum 36. The periphery of the drum 36 is coated with a smooth layer of refractory oxide in the same way as in the previous embodiments described and the layer is maintained continuously in contact with the root at the welding point of a strip 37 by movement of the drum 36 during the welding process which is effected from the outside.

The oxide coating on the various supports hereinbefore described with reference to FIGS. 1 to 10 has the desirable properties of adhesion to the support, nonfriability, flexibility, high melting point, chemical stability and nonwettability by molten metal, and results in the following advantages:

(1) Reduction in the need for the services of a highly skilled root run welder.

(2) Smaller or no root gaps between the prepared faces to be welded, thus reducing the volume of weld metal required to complete the joint.

(3) Elimination of the need for back-chipping and sealing runs on the root.

(4) Where welding is carried out from both sides, for example, "double-V" preparation as illustrated in FIG. 5, the backing member is profiled and fitted into one side. After deposition of the root run or runs on the other side, the backing member is removed and welding can then be completed in any desired sequence without prior back-chipping.

(5) Improved quality of weld metal due to conservation of the heat of the root run(s) by the backing member, which conservation refines the grain structure of the weld.

(6) Longitudinal or circumferential welds may be effected in large diameter shells from the inside only, the root of the weld being thus exposed for ready visual and other inspections after removal of the backing member which may be in the form of a strap.

I claim:

1. A method of forming a welded joint between adjacent faces of metallic members comprising the steps of positioning said faces in spaced relationship to define a welding groove therebetween, positioning a metal weld backing member with a flat continuous surface thereof immediately adjacent said groove, said face being coated with a refractory oxide selected from the group consisting of alumina and zirconia in particulate form deposited thereon as at least partly molten, finely divided particles resulting from projecting said oxide towards said face from a region having a temperature in excess of the fusion point of said oxide, said coating serving as a backing for the root of said groove, and effecting a weld in said groove.

2. A method of forming a welded joint between adjacent faces of metallic members comprising the steps of positioning said faces in spaced relationship to define a welding groove therebetween, positioning a metal weld backing member with a flat continuous face surface thereof immediately adjacent said groove, said face being coated with a refractory oxide selected from the group consisting of alumina and zirconia applied by feeding a rod of said oxide into a flame hot enough to melt said oxide, atomizing the molten oxide with a blast of gas as it melts and spraying the atomized molten oxide onto said face of the backing member, said coating serving as a backing for the root of said groove, and effecting a weld in said groove.

References Cited

UNITED STATES PATENTS

| 2,472,523 | 6/1949 | Dillon et al. | 228—50 |
| 2,707,691 | 5/1955 | Wheildon | 117—105.2 |
| 2,294,439 | 9/1942 | Bagley | 29—491 |
| 2,320,700 | 6/1943 | Kent et al. | 29—491 |
| 2,362,505 | 11/1944 | Smith | 29—491 |
| 2,673,916 | 3/1954 | Meyer | 29—490 |
| 2,786,934 | 3/1957 | Ohnstad | 219—160 |
| 2,796,843 | 6/1957 | Kleppinger | 29—491 |
| 2,916,001 | 12/1959 | Chyle et al. | 228—50 |
| 3,227,349 | 1/1966 | Frederick | 228—50 |

JOHN F. CAMPBELL, *Primary Examiner.*

U.S. Cl. X.R.

219—160; 228—50